Oct. 4, 1955     P. G. VICARD     2,719,631
METHODS OF AND DEVICES FOR EFFECTING CENTRIFUGAL SEPARATION
Filed Feb. 4, 1952
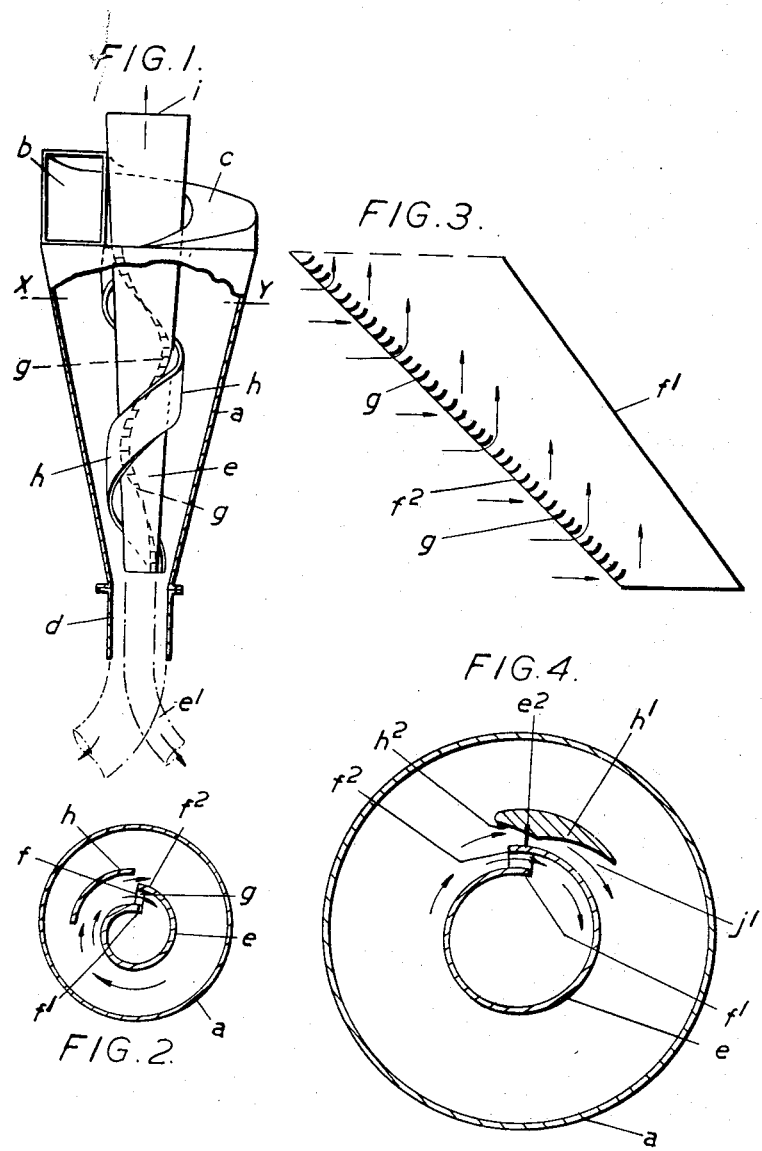
Inventor
PIERRE GEORGES VICARD

United States Patent Office 2,719,631
Patented Oct. 4, 1955

2,719,631

METHODS OF AND DEVICES FOR EFFECTING CENTRIFUGAL SEPARATION

Pierre Georges Vicard, Lyon, France

Application February 4, 1952, Serial No. 269,705

Claims priority, application France March 22, 1951

3 Claims. (Cl. 210—51)

The present invention relates to improvements in methods and devices for effecting centrifugal separation, with a view to obtaining a more thorough separation whilst using less motive power. The separation is to be effected between a fluid and a heavier substance dispersed in or mixed with the fluid. The fluid may be liquid or gas and the heavier substance may be liquid, gaseous or solid. Thus a separation may be effected between liquids or gases of different specific weights or between liquids and gases or between liquids or gases and solid particles carried therein. In known centrifugal separators, the fluid, whether a liquid or a gas, is subjected to a vortex motion as long as is necessary for the solid particles or the liquid of greater specific weight to be thrown outwardly from the separator. In this way, an important part of the fluid, that which has been most quickly separated, is kept in motion to no purpose.

Furthermore, the outflow of the separated fluid is accompanied with a high loss of load and a considerable loss of energy for a given result.

Moreover, when the fluid carries fine particles the latter form an apparently inseparable body with said fluid, the particles and fluid being kept together because of the viscosity effect.

The present invention involves effecting the desired separation, with the maximum efficiency, on a portion, or vein of the fluid located inside the vortex.

The invention also comprises imparting to that portion of the fluid about to be subjected to the maximum effect of the centrifugal force a sudden acceleration so that the particles carried in the fluid, even the finest particles which formed an apparently inseparable body with the fluid, cannot follow as quickly. These particles assume a motion of their own, delayed as compared with the speed of the fluid. If, at this moment, a powerful centrifugal impulse is exerted, these particles will part with the fluid, meeting with less resistance in so doing, as in mechanics, the friction ratio whilst in motion is less than at rest.

The invention may effectively combine the separation specified above in the same apparatus as the centrifugal separation arrived at by the already known means.

The invention may also provide for the continuous removal from the separator of the part thus separated inside the vortex by the transformation, without loss of speed and without any swirl, of the rotary motion of the separated fluid into a movement parallel to the axis of rotation. Under these conditions, the outflow of the fluid in the inner part of the whirling body of fluid and its evacuation take place with the minimum loss of load. By applying the Bernoulli theorem and taking into account the centrifugal pressure growing stronger and stronger from the inside outwardly, it can be demonstrated that the tangential speeds are inversely proportional to the ratio of the rotation radii. In other words, the inner tangential speed may be 3 to 5 times faster than the outer tangential speed, and the centrifugal effect 9 to 25 times greater in the inside portion than in the outer one, thus increasing the required effect. The lower speeds prevailing in the outer parts of the vein of fluid only cause a slight loss of load, and in this manner, foster the gathering, without disturbing swirl, of the particles of greater specific density at the periphery and their outflow with a minimum of wear.

The invention also comprises a device for carrying out the above specified method.

According to this part of the invention the device comprises a separator casing in the form of a truncated cone, having an inlet for the fluid at the top thereof and tangential to the axis of the cone whence it descends with a vortex motion, a central outlet duct in said casing, said duct having a slit over its length, and a vane located at a short distance from the slit outside the duct, which slit and vane are arranged to deflect part of the fluid through the slit into the duct. The slit and vane may be arranged helicoidally similar to the direction of the fluid in the casing. Deflector-fins or baffles are provided inwardly near to the edge of the slit in order to turn the vortex motion of the fluid into an outlet movement along the duct. The vane and slit may be arranged to form a converging-diverging channel, resembling a Venturi tube, adapted to accelerate an inner portion of the rotating fluid to an extent greater than can be followed by particles in the fluid.

To sum up, in accordance with the invention, the separation takes place, not only centrifugally through the bulk of the gyrating mass, but principally in the portion located inside said mass and there occurs, with the maximum efficiency, owing to the small diameter of said portion, to its great gyratory speed, to the absence of swirl due to the perfect guiding of the vortex- and straightening-up motions and to the translation motion towards the outlet. Moreover, thanks to the sudden speeding-up, the separation is rendered more effective for fluids containing very fine particles.

The accompanying diagrammatic drawings illustrate the invention by way of example. In the drawings:

Figure 1 is an elevational view of a centrifugal separator made in accordance with the invention, the casing of which is shown partly cut-away;

Figure 2 is a diametrical cross-section on the plane X—Y of Figure 1;

Figure 3 is a development of the helicoidally split tube shown in Figure 1, carrying on one of its long edges the flow-directing baffles above-mentioned; and Figure 4 is a view similar to Figure 2, but enlarged for the sake of clearness, representing the lay-out of the converging-diverging channel which assists in the separation of the fine particles from the whirling fluid.

A truncated-cone shaped casing $a$ is provided at the top thereof with an inlet duct $b$ for entry of the fluid to be separated, which fluid enters the apparatus tangentially, said duct being continued to the position where the vortex motion starts.

A helicoidal upper wall $c$ covers the duct, directing the fluid until the latter has effected a complete turn in the casing, the end of said first turn coming approximately below its starting point.

The vortex of fluid is contained in the conical part of the casing $a$ ending at the bottom in a duct $d$ for the evacuation of the liquid, gas or solid matter of higher specific weight separated from the lighter fluid.

This lighter fluid can only escape through a tubular central duct $e$ provided as is well seen in Figure 2, with an entrance and guiding slit $f$, approximately helicoidal and extending to the full height of the duct which is placed inside the casing $a$. Said slit has two edges, an inner one $f^1$, and an outer one $f^2$, the latter overlapping the first slightly and being directed the opposite way to the vortex motion of the fluid in such a way that, between said two edges, an inlet is provided for the admission of part of the fluid into the tubular duct $e$. In this inlet for the fluid, baffles $g$ are located, transforming the vortex motion of the fluid passing through them into a movement parallel to the vortex axis of the whirling mass, as shown in Figure 3.

A steadying wall or partition $h$, concentric with the vortex and approximately helicoidal is fitted facing the above-described slit, thus forming with the latter a guiding channel for the fluid which is to enter said slit, the surplus fluid not having been absorbed by this slit returning to the vortex, as shown in Figure 2.

In Figure 4, the steadying and deflecting walls are shown, on their sides facing each other, with such a shape that they combine to form a convergent-divergent channel, after the manner of a venturi, the converging part being made up, upstream, by that portion located between $e^2$ and $h^2$ and the diverging part, coming next, being shown by the passage $j^1$.

The duct $e$ is continued at its upper part by a spreader $i$ causing the outlet speed to be lowered and also the loss of charge of the separator to be avoided. The high translation speed in said duct corresponds, for a given flow, to a small diameter, thus increasing the separation of the elements of the fluid being operated upon.

A part of the light fluid inwardly separated can be evacuated by a continuation $e^1$ at the lower end of the central duct $e$.

I claim:

1. In apparatus for effecting centrifugal separation of a fluid and a heavier substance dispersed in the fluid, a separator casing of truncated conical form, a fluid inlet at the larger upper end of said casing through which the fluid is admitted to the casing in a tangential direction and passes downwardly therealong in the form of a vortex, a tubular duct arranged centrally within the casing and extending over at least substantially the entire casing length, said duct having in its wall a helicoidal slit extending over the full duct length in a direction similar to that of the rotating fluid and arranged with one of its edges overlapping the other in spaced relationship whereby the slit faces the direction of the rotating fluid, a helicoidal vane having the same direction as the slit also arranged within the casing and spaced outwardly from the slit thereby to collect a central part of the rotating fluid between the duct and the vane, said vane having the inner surface portion extending from its leading edge shaped to direct the collected fluid towards the duct at an increased speed whereby a part of said collected fluid enters the slit in the duct at a high velocity, and having the inner surface portion extending to its trailing edge shaped to return the other part of the collected fluid into the vortex, and means within the slit by which the part of the fluid entering the slit is directed upwardly within the duct at said high velocity without swirling.

2. A process of effecting a separation by centrifugal action of a fluid and of a much heavier substance dispersed in the fluid which comprises causing the fluid to rotate, subjecting the fluid in rotation in the central part thereof to a sudden acceleration of velocity, which the particles of the heavier substance in suspension cannot follow, which particles accordingly receive a relative movement in regard to the fluid, which accelerates the centrifugal separation; collecting in the most central zone of the body of fluid a current over the whole height of the body of fluid, said body rolling itself interiorly round in centripetal spiral perpendicular to the axis of rotation; and transforming the movement of centripetal spiraled rotation of the fluid into movement of translation parallel to the axis of rotation without loss of velocity and without eddies.

3. In an apparatus for effecting a separation by centrifugal action of a fluid and of a heavier substance dispersed in the fluid, a separator casing in the shape of a truncated cone, an entrance for the fluid at the larger end of the said casing by which the fluid is admitted in a tangential direction and passes along the casing in swirling condition, a discharge conduit arranged in the centre of the casing in the form of a helicoidal gap in a tube in order to give to the spiraled centripetal movement of rotation a passage through the helicoidal gap over the whole height of the casing, and direction rectifying means located in said gap and serving to transform the spiraled centripetal movement of rotation of the fluid into movement of translation parallel to the axis of rotation without loss of velocity and without eddies.

References Cited in the file of this patent

UNITED STATES PATENTS

| | | |
|---|---|---|
| 1,029,214 | Morse | June 11, 1912 |
| 1,152,125 | Sherwood | Aug. 31, 1915 |
| 1,753,490 | Whitmore | Apr. 8, 1930 |
| 2,153,270 | Osgood | Apr. 4, 1939 |
| 2,343,682 | McCurdy | Mar. 7, 1944 |
| 2,360,595 | Thompson | Oct. 17, 1944 |

FOREIGN PATENTS

| | | |
|---|---|---|
| 494,107 | Germany | Mar. 19, 1930 |
| 29,889 | Great Britain | 1909 |
| 330,163 | Great Britain | June 5, 1930 |